United States Patent Office 3,475,432
Patented Oct. 28, 1969

3,475,432
PYRROLO(1,2-α)QUINAZOLINE-1,5-(2H,3H)DIONES
Stanley C. Bell, Penn Valley, and Peter H. L. Wei, Upper Darby, Pa., assignors to American Home Products Corporation, New York, N.Y., a corporation of Delaware
No Drawing. Filed Dec. 8, 1967, Ser. No. 689,008
Int. Cl. C07d 57/14; A61k 27/00
U.S. Cl. 260—251                 6 Claims

ABSTRACT OF THE DISCLOSURE

This invention concerns pyrrolo(1,2-a)quinazoline-1,5-(2H,3H)diones which are pharmacologically active as central nervous system depressants.

---

This invention relates to new and novel tricyclic compounds. In particular, this invention is concerned with pyrrolo(1,2-a)quinazoline-1,5-(2H,3H)diones which have central nervous system depressant properties when tested under standard and acceptable pharmacological procedures. They are, therefore, deemed to possess utility in experimental and comparative pharmacology.

The new and novel compounds within the purview of the present invention are exemplified by the following formula:

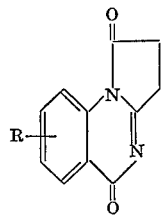

wherein R is selected from the group consisting of hydrogen, sulfamoyl, halogen, lower alkyl and lower alkoxy. The terms "lower alkyl" and "lower alkoxy" as employed herein are meant to include both branched and straight chain moieties having from about one to about eight carbon atoms. Typical example of these compounds are: 7 - chloropyrrolo(1,2-a)quinazoline-1,5-(2H,3H) - dione; and pyrrolo(1,2-a)quinazoline-1,5-(2H,3H)-dione.

The new and novel compounds of the present invention are prepared by the process which is hereinafter schematically illustrated:

wherein R is defined as above. The acylation reaction is effected by reacting an appropriate anthranilamide (I) with succinic anhydride (II) in a reaction-inert organic solvent at temperatures up to about 150° C. for a period of about one to about four hours. Preferably, this reaction is conducted at about 150° C. for a period of about two hours. When the acylation is complete, the resulting 2'-carbamoylsuccinanilic acid (III) is separated by standard recovery procedures. For example, the reaction mixture is cooled, diluted with water, filtered and the collected solid recrystallized from a suitable solvent, e.g., an alkanol.

The cyclization reaction is effected by contacting an above prepared 2'-carbamoylsuccinanilic acid (III) with a carboxylic acid anhydride in a reaction-inert organic solvent at a temperature range from about 20° C. to about 100° C. for a period of about ten hours to about two weeks. When the cyclization is complete, the resulting 1,4-dihydro-4-oxo-2-quinazolinepropionic acid (IV) is separated by conventioned methods. For example, the reaction mixture is admixed with a benzene-cyclohexane or a toluene-ether mixture and the resulting solid (IV) collected by filtration.

The ring closure reaction is effected by contacting an above prepared 1,4-dihydro-4-oxo-2-quinazolinepropionic acid (IV) with acetic anhydride in dimethylformamide at a temperature range from about 50° C. to about 100° C. for a period of about fifteen minutes to about forty-eight hours. When the ring closure is complete, the resulting pyrrolo(1,2-a)quinazoline-1,5-(2H,3H)-dione (V) is separated by known recovery procedures. For example, the reaction mixture is cooled, filtered, washed with an alkanol and recrystallized from an appropriate solvent, e.g., dimethylformamide. This ring closure reaction also produces an isomeric by-product which is a pyrrolo(2,1-b)quinazoline-1,9(2H,3H)-dione (VI). The yield of this isomeric by-product (VI) is increased when the above-described reaction is conducted at higher temperatures for longer periods of time, e.g., at about steam bath temperatures for a period of about one hour.

The anthranilamides (I) which are employed as starting materials in the above described process are commercially available or are readily prepared by procedures well known in the chemical art. The new and novel pyrrolo (1,2-a)quinazoline-1,5-(2H,3H)-diones (V) of the present invention possess valuable pharmacological activity. In particular, these compounds in standard pharmacological procedures demonstrate nervous system activity and are useful as depressants. Because of this property they are of

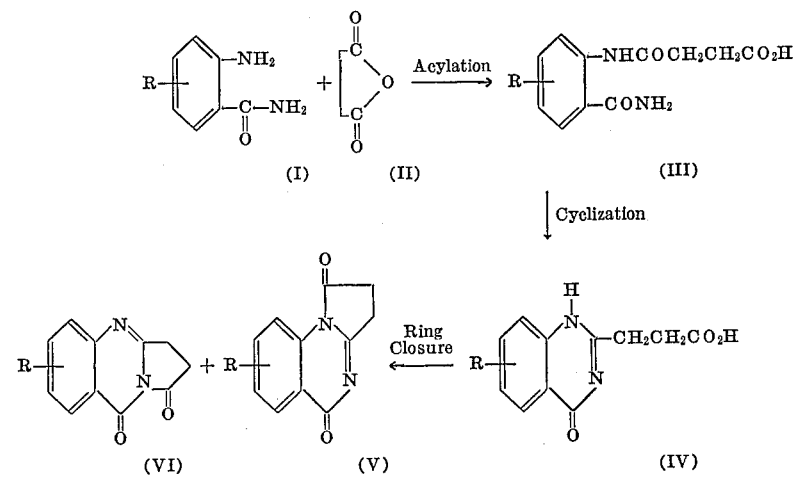

importance in experimental and comparative pharmacology.

In the pharmacological evaluation of the central nervous system depressant compounds of this invention the in vivo effects of the compounds of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anti-convulsant activity.

The compounds of this invention in the above test procedure induce decreased motor activity at 40 mg./kilo.; sedative-ataxic effects at 127 mg./kilo. and decreased respiration at 127 mg./kilo.

EXAMPLE I

To a mixture of 25.0 g. of 5-chloroanthranilamide in 100 ml. of dimethylformamide, there is added 20 g. of succinic anhydride and the reaction mixture is gradually heated to 150° C. for three hours. The reaction mixture is cooled, diluted with water and filtered to separate 35 g. of product, M.P. 222–224° C. which is recrystallized from ethanol to afford 2'-carbamoyl-4'-chlorosuccinanilic acid, M.P. 225–227° C.

Analysis.—Calc'd for $C_{11}H_{11}ClN_2O_4$: C, 48.81; H, 4.10; N, 10.35; Cl, 13.10. Found: C, 48.78; H, 4.20; N, 9.99; Cl, 13.0.

A mixture of the above prepared 2'-carbamoyl-4'-chloro-succinanilic acid in 150 ml. of dimethylformamide and 70 ml. of acetic anhydride is allowed to stand at room temperature for two weeks. The solution is then diluted with 200 ml. of benzene and 200 ml. of cyclohexane and chilled. In this manner, there is obtained 6-chloro-1,4-dihydro-4-oxo-2-quinazolinepropionic acid.

A mixture of 24 g. of the above obtained 6-chloro-1,4-dihydro-4-oxo-2-quinazolinepropionic acid, 65 ml. of dimethylformamide and 35 ml. of acetic anhydride is heated on a steam bath for 20–25 minutes. Thereafter, the reaction mixture is cooled, filtered and then washed with ethanol to yield 18 g. of product, M.P. 224–226° C. which is recrystallized from dimethylformamide to afford 7-chloropyrrolo(1,2-a)quinazoline - 1,5 - (2H,3H)-dione, M.P. 230–233° C.

Analysis.—Calc'd for $C_{11}H_7ClN_2O_2$: C, 56.30; H, 3.01; N, 11.94; Cl, 15.11. Found: C, 56.29; H, 2.80; N, 11.98; Cl, 14.9.

In like manner, 8-bromopyrrolo[2,1-a]quinazoline-1,5 (2H,3H) - dione; 7 - iodopyrrolo[1,2-a]quinazoline-1,5 (2H,3H)-dione; and 8-fluoropyrrolo[1,2-a]quinazoline-1,5(2H,3H)-dione are synthesized.

EXAMPLE II

When the latter ring closure reaction of Example I is repeated employing the same reactants at steam bath temperatures for forty-five minutes both the above prepared 7-chloropyrrolo (1,2-a)quinazoline-1,5-(2H,3H)-dione and an isomeric by-product thereof are produced. When the latter isomer is recrystallized from acetonitrile, there is obtained 7-chloropyrrolo[2,1-b]quinazoline-1,9 (2H,3H)-dione, M.P. 225–227° C.

Analysis.—Calc'd for $C_{11}H_7ClN_2O_2$: C, 56.30; H, 3.01; N, 11.94; Cl, 15.11. Found: C, 56.40; H, 2.83; N, 11.97; Cl, 15.0

EXAMPLE III

To a mixture of anthranilamide (50.0 g.) in 200 ml. of tetrahydrofuran, there is added succinic anhydride (40.0 g.) and the reaction mixture is gradually heated to 150° C. for four hours. The reaction mixture is cooled, diluted with water, filtered and recrystallized from ethanol to afford 2'-carbamoylsuccinanilic acid.

A mixture of the above prepared 2'-carbamoylsuccinanilic acid in 300 ml. of tetrahydrofuran and 150 ml. of propionic anhydride is heated on a steam bath for ten hours. The solution is then diluted with 400 ml. of toluene and 400 ml. of ether and chilled. In this manner, there is obtained -1,4-dihydro-4-oxo-2-quinazolinepropionic acid.

A mixture of 9.2 g. of the above obtained 1,4-dihydro-4-oxo-2-quinazolinepropionic acid, 50 ml. of dimethylformamide and 70 ml. of acetic anhydride is stirred at room temperature for forty-eight hours. Thereafter the reaction mixture is cooled and filtered to afford 5.0 g. of pyrrolo(1,2-a)quinazoline - 1,5 - (2H,3H)-dione, M.P. 202–203° C.

Analysis.—Calc'd for $C_{11}H_{10}N_2O_3$: C, 60.55; H, 4.62; N, 12.84. Found: C, 60.05; H, 4.72; N, 13.02.

Similarly, starting with 5-sulfamoylanthranilamide there is obtained 7 - sulfamoylpyrrolo(1,2-a)quinazoline-1,5-(2H,3H)-dione.

EXAMPLE IV

To a mixture of 5-methylanthranilamide (12.5 g.) in 100 ml. of dimethylforamide, there is added succinic anhydride (10.0 g.) and the reaction mixture is gradually heated to 150° C. for two hours. The reaction mixture is cooled, diluted with water, filtered and recrystallized from methanol to afford 2'-carbamoyl-4'-methylsuccinanilic acid.

A mixture of the above prepared 2'-carbamoyl-4'-methylsuccinanilic acid in 75 ml. of dimethylformamide and 35 ml. of acetic anhydride is heated to 60° C. for five days. The solution is then diluted with 100 ml. of benzene and 100 ml. of cyclohexane and chilled. In this manner, there is obtained -1,4-dihydro-6-methyl-4-oxo-2-quinazolinepropionic acid.

A mixture of the above obtained -1,4-dihydro-6-methyl-4-oxo-2-quinazolinepropionic acid, 35 ml. of dimethylformamide and 17 ml. of acetic anhydride is heated on a steam bath for 20–25 minutes. Thereafter, the reaction mixture is cooled, filtered, washed with ethanol, and recrystallized from dimethylformamide to afford 7-methylpyrrolo(1,2-a)quinazoline-1,5-(2H,3H)-dione.

In the same manner, 8-ethylpyrrolo(1,2-a)quinazoline-1,5-(2H,3H)-dione; and 7-butylpyrrolo(1,2-a)quinazoline-1,5-(2H,3H)-dione are obtained.

EXAMPLE V

To a mixture of 4-methoxyanthanilamide (25.0 g.) in 100 ml. of dimethylformamide, there is added 20 g. of succinic anhydride and the reaction mixture is gradually heated to 150° for three hours. The reaction mixture is cooled, diluted with water, filtered to separate the product which is then recrystallized from ethanol to afford 2'-carbamoyl-5'-methoxysuccinanilic acid.

A mixture of the above prepared 2'-carbamoyl-5'-methoxysuccinanilic acid in 150 ml. of dimethylformamide and 70 ml. of acetic anhydride is allowed to stand at 25° C. for two weeks. The solution is then diluted with 200 ml. of benzene and 200 ml. of cyclohexane and chilled. In this manner, there is obtained -1,4-dihydro-7-methoxy-4-oxo-2-quinazolinepropionic acid.

A mixture of the above obtained -1,4-dihydro-7-methoxy-4-oxo-2-quinazolinepropionic acid, 65 ml. of dimethylformamide and 35 ml. of acetic anhydride is heated on a steam bath for 20–25 minutes. Thereafter, the reaction mixture is cooled, filtered, and then washed with ethanol to yield the product which is recrystallized from dimethylformamide to afford 8-methoxypyrrolo(1,2-a)quinazoline-1,5-(2H,3H)-dione.

Repeating the above procedure and starting with 5-propoxyanthranilamide, there is obtained 7-propoxypyrrolo(1,2-a)quinazoline-1,5-(2H,3H)-dione.

What is claimed is:

1. A compound selected from the group consisting of those having the formula:

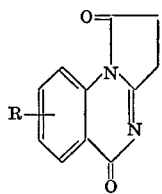

wherein R is selected from the group consisting of hydrogen, chloro, bromo, iodo, fluoro, sulfamoyl, lower alkyl containing up to four carbon atoms and lower alkoxy containing up to four carbon atoms.

2. A compound as described in claim 1 which is: 7-chloropyrrolo(1,2-a)quinazoline-1,5-(2H,3H)-dione.

3. A compound as described in claim 1 which is: 8-bromopyrrolo(1,2-a)quinazoline-1,5(2H,3H)-dione.

4. A compound as described in claim 1 which is: pyrrolo(1,2-a)quinazoline-1,5-(2H,3H)-dione.

5. A compound as described in claim 1 which is: 7-methylpyrrolo(1,2-a)quinazoline-1,5-(2H,3H)-dione.

6. A compound as described in claim 1 which is: 8-methoxypyrrolo(1,2-a)quinazoline-1,5-(2H,3H)-dione.

References Cited

Boehme et al.: C.A. 56, 471 g (1962).

ALEX MAZEL, Primary Examiner

R. V. RUSH, Assistant Examiner

U.S. Cl. X.R.
260—256.5, 999